Dec. 5, 1961   J. I. R. BOWRING ET AL   3,011,826
LIGHTWEIGHT CREW SEAT FOR HIGH PERFORMANCE FLIGHT VEHICLES
Filed Jan. 6, 1960   7 Sheets-Sheet 1

INVENTORS
JOHN I. R. BOWRING
WILLIAM ELKINS
BY
ATTORNEYS

Dec. 5, 1961   J. I. R. BOWRING ET AL   3,011,826
LIGHTWEIGHT CREW SEAT FOR HIGH PERFORMANCE FLIGHT VEHICLES
Filed Jan. 6, 1960   7 Sheets-Sheet 2
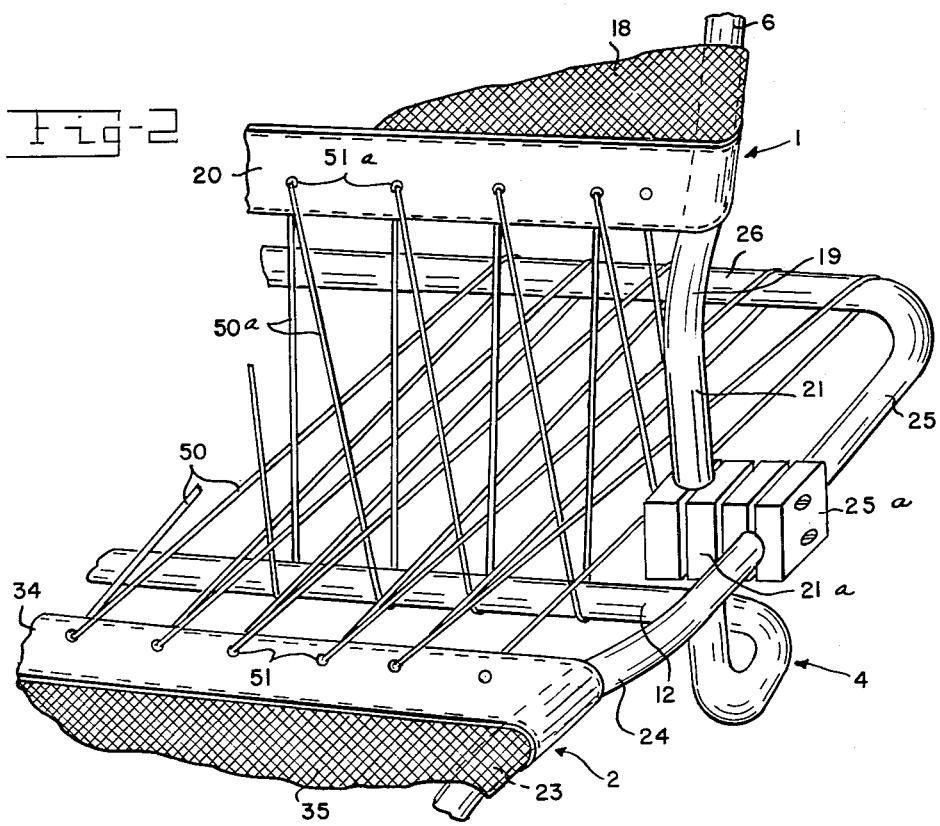
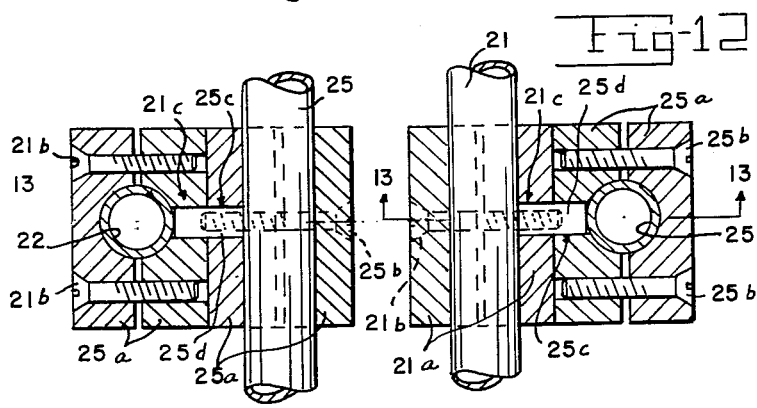
*INVENTORS*
JOHN I. R. BOWRING
WILLIAM ELKINS
BY
ATTORNEYS

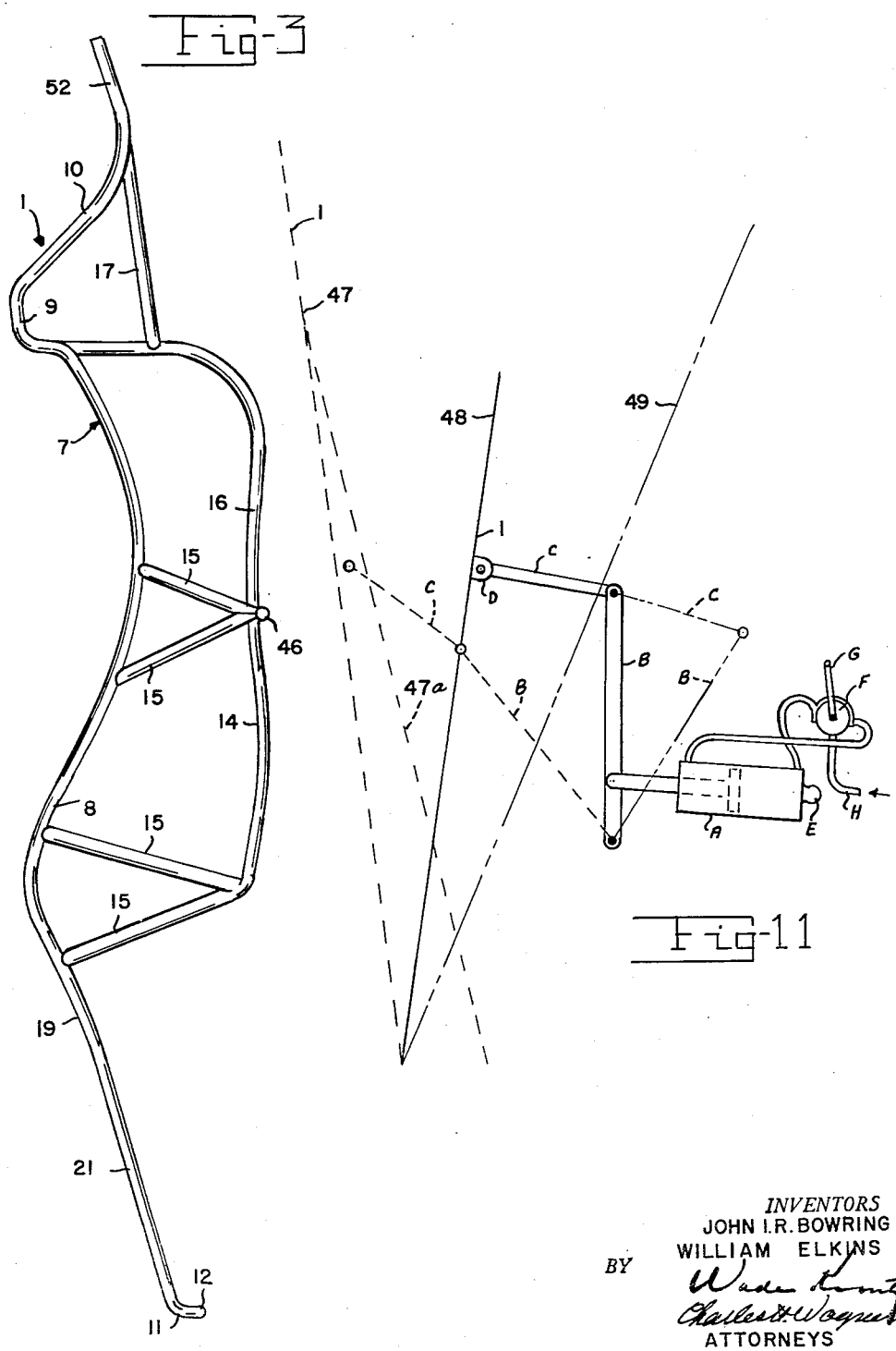

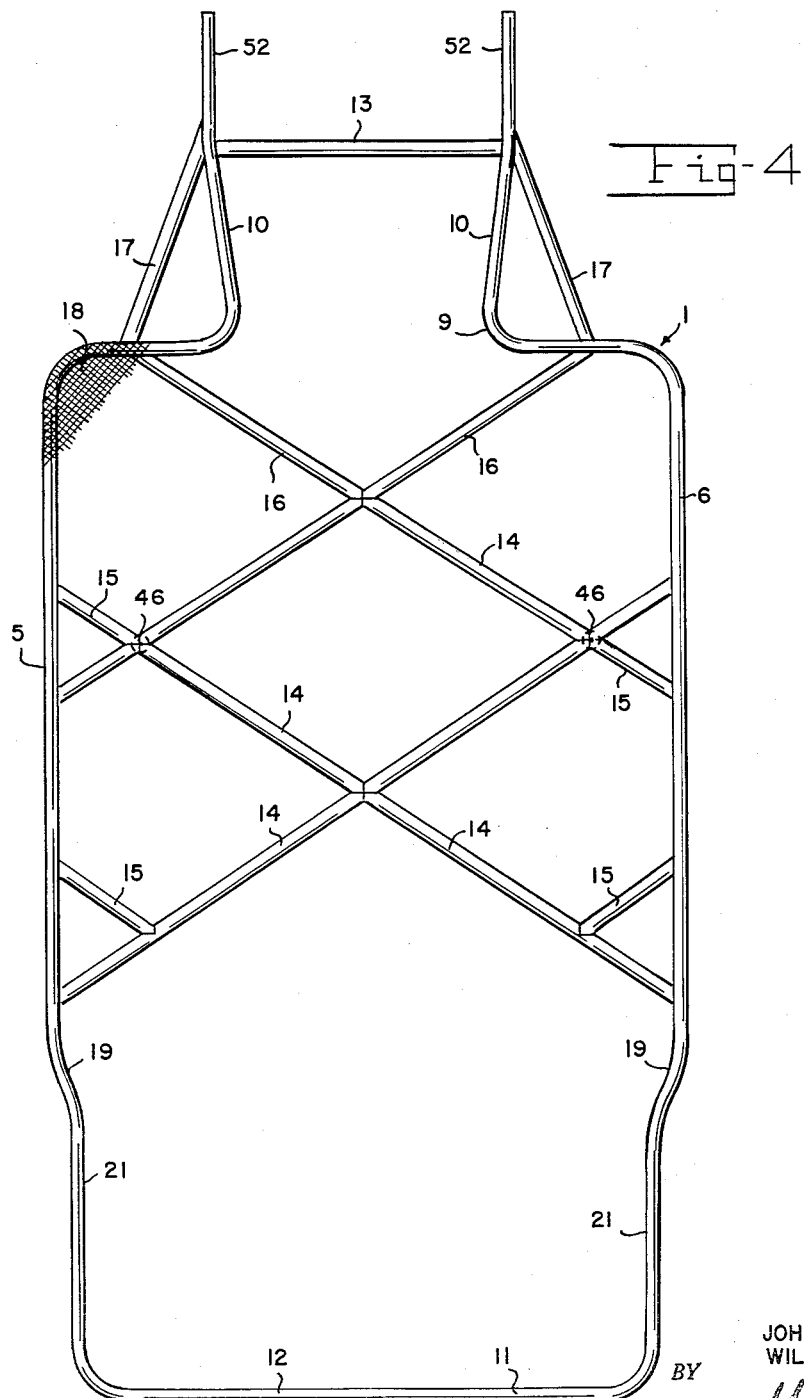

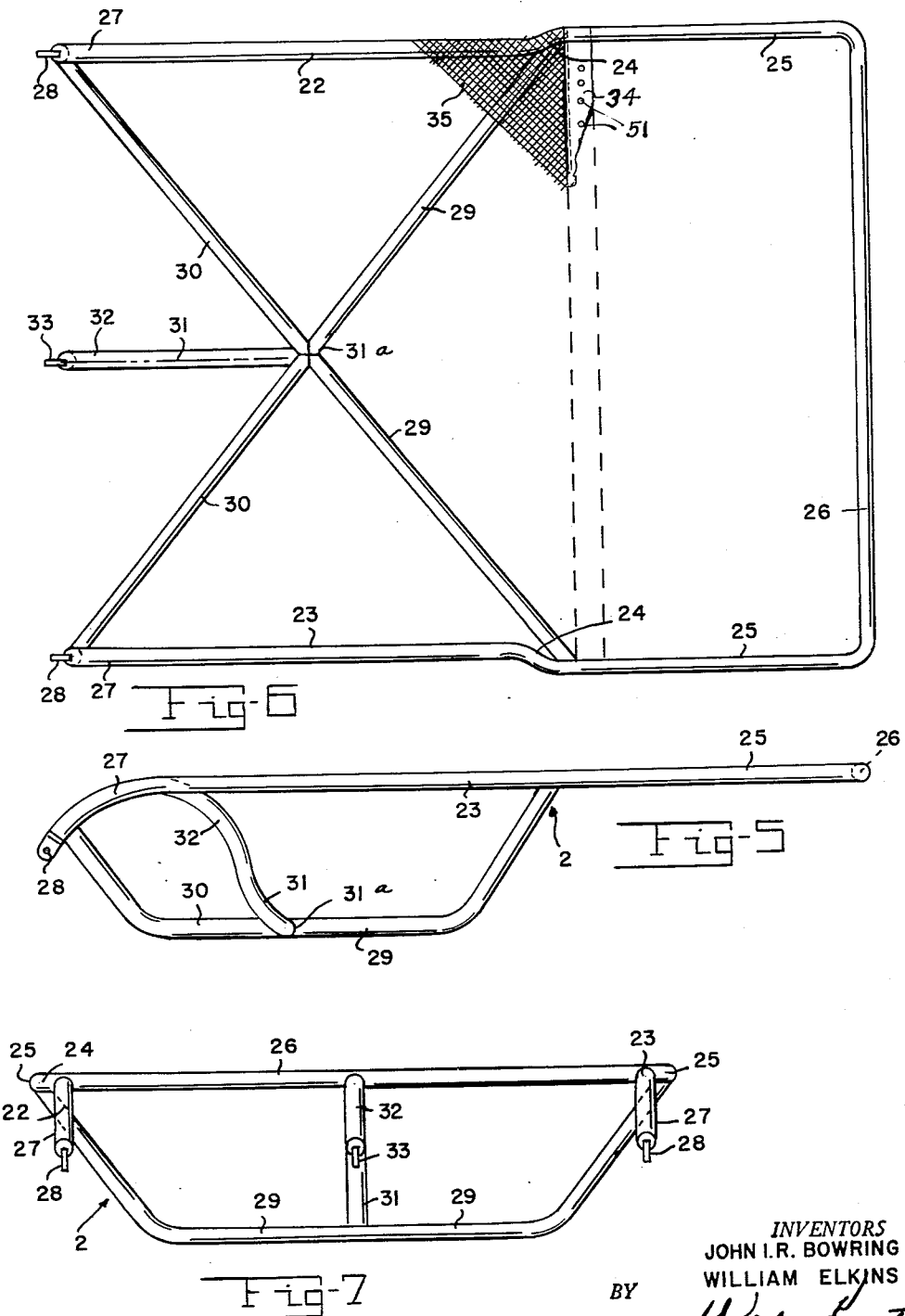

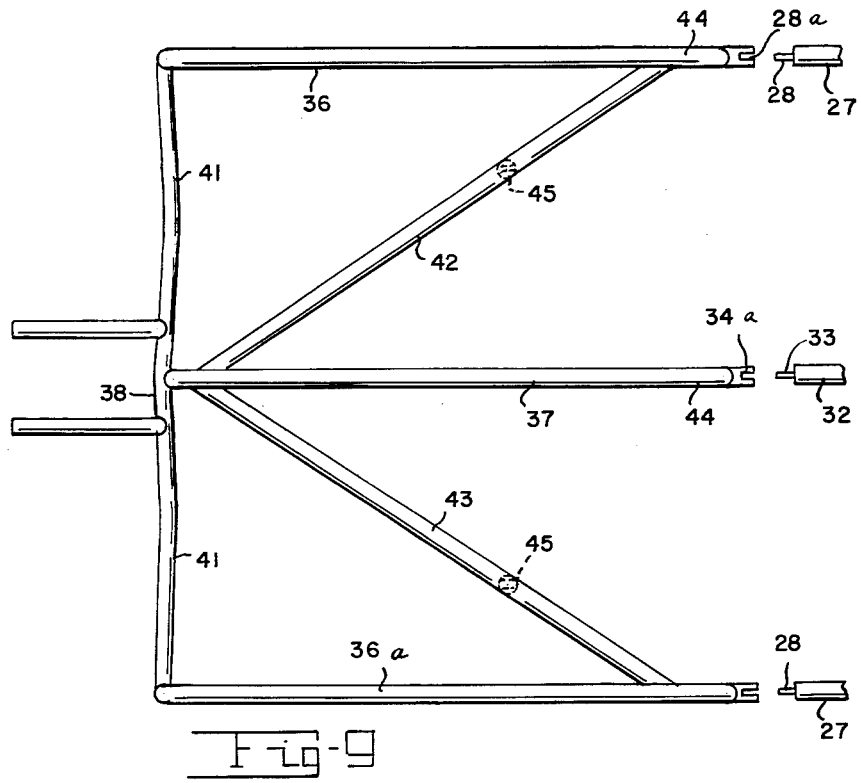
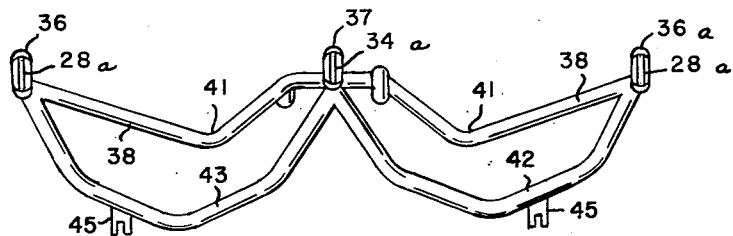

United States Patent Office 3,011,826
Patented Dec. 5, 1961

3,011,826
LIGHTWEIGHT CREW SEAT FOR HIGH
PERFORMANCE FLIGHT VEHICLES
John I. R. Bowring, Dayton, Ohio, and William Elkins, Marietta, Ga.; said Bowring assignor to Minister of Aviation in Her Majesty's Government of the United Kingdom of Great Britain and Northern Ireland, London, England, and said Elkins assignor to the United States of America as represented by the Secretary of the Air Force
Filed Jan. 6, 1960, Ser. No. 901
9 Claims. (Cl. 297—383)

The invention described herein may be manufactured and used by or for the United States Government for governmental purposes without payment to us of any royalty thereon.

This invention relates to improved seats for use in aircraft, and more particularly to a lightweight crew seat for high performance flight vehicles which offers resistance of the seat occupant to very high acceleration, vibration, deceleration and impact loads of high magnitude.

An object of the invention is the provision of a pilot's or crew's seat which offers extreme comfort to the occupant, and means for increasing the occupant's resistance to the adverse effects of high acceleration forces to which he may be subjected in take-off, flight, deceleration and crash loads and involves a seat having a yieldable body-conforming supporting means for the pilot's or occupant's head, back, body, arms and legs.

A further object is the provision of a pilot's seat having a strong lightweight tubular reinforced frame comprising a back rest including a head rest, a seat pan, and a leg rest, in which the back rest and seat pan are yieldably connected to each other for angular adjustment, and includes a yieldable fabric covering of nylon or dacron mesh connected to the frame and extending across the seat pan and leg rest without interruption and a second yieldable fabric covering extending across the back and head rest longitudinally, in which yieldable connecting means are provided between the back rest and seat pan and connected to the adjacent ends of the yieldable fabric covering at the juncture between the back rest and the seat pan.

A further object is a composite seat with combined high strength with low weight.

A further object is the provision of an aircraft seat comprising an upper adjustable back and head rest frame, an adjoining seat pan frame, and a leg rest frame adjustably connected to the forward end of the seat pan frame, which is constructed of strong lightweight small tubing outlining the sides of the back, the seat pan, the leg rest, the upper end of the back and head rest, and the lower end of the leg rest, with a yieldable resilient back and head-supporting fabric stretched across the back and head rest frame on said tubing in unsupported relation therebetween, and a yieldable resilient seat pan and leg rest supporting fabric stretched across the tubing of the seat pan and leg rest portion in unsupported relation therebetween from the lower end of the leg rest frame to the rear portion of the seat pan frame, and includes adjustable flexible lacing means connecting the adjacent edges of fabrics at the lower portion of the back rest and at the rear end portion of the seat pan.

A further object is the utilization of the arrangement of the lacing means between the adjacent ends of the yieldable resilient fabrics to provide means for permitting angular adjustment of the back rest relative to the seat pan, and also providing for adjustment between the seat pan and back rest for different size personnel as well as for adjustment of the longitudinal tension on the yieldable fabric on the leg rest, seat pan, and back and head rests.

A further object includes lightweight tubular brace means extending between side frames of the seat pan and back rest located in materially depressed or offset relation to the stretched fabric to prevent the occupant from contact therewith during extreme acceleration forces on the seat and the occupant.

A further object is the contouring of the tubular side frames of the leg rest, seat pan, and back and head rests to substantially conform to the average contour of the back of the legs, seat, body and the head of the occupant so that the stretched fabric covering will initially conform substantially to the back of the legs, seat, back and head of the occupant to support the occupant substantially uniformly from head to foot during accelerations.

A further object is the provision of a body supporting rest device for resisting high acceleration, which is adjustable longitudinally for occupants of different heights, and angularly adjustable for different conditions of aircraft take-off, normal flight, and rest.

A further object is the provision of a seat which is readily adjustable to accommodate substantially all tall and short personnel of Air Force flying crews.

Other objects and advantages of the invention will become apparent from the following description and accompanying drawings in which like reference characters refer to similar parts in the several figures of the drawings.

Drawings

FIG. 2 is a fragmentary somewhat diagrammatic view, more clearly showing the lacing adjustments and connection between the lower end of the back rest frame, the rear end of the seat pan frame, and between the adjacent ends of the stretched resilient fabrics on the seat pan frame and leg rest frame, and on the back and head rest frame;

FIG. 3 is a side elevation of the back and head rest frame;

FIG. 4 is a plan view of the frame shown in FIG. 3;

FIG. 5 is a side elevation of the seat pan frame;

FIG. 6 is a top plan view or elevation of the seat pan frame shown in FIG. 5;

FIG. 7 is an end view of the seat pan frame looking toward the leg section adjoining end;

FIG. 9 is a top plan view of the leg rest supporting frame;

Figure 14:
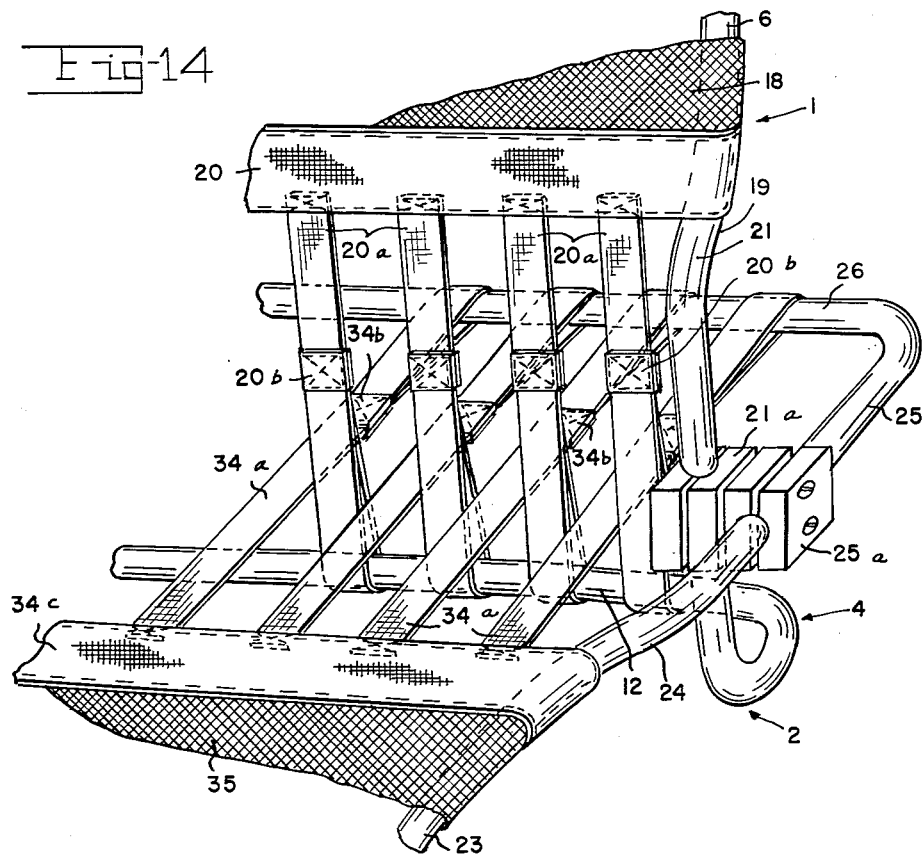

FIG. 10 is an end view of the leg supporting frame, looking toward the hinge end thereof; and FIG. 11 is a diagrammatic view showing the relative positions or angles of adjustment of the back rest during "launch" or take-off, "normal work," and "rest" positions, also showing diagrammatically the general change in position of the occupant's body during high acceleration, due to resilient stretch of the fabric covering on the tubular frames;

FIG. 12 is a sectional view of one of the cooperating adjustable pivot means between the side rods of the back rest frame and the seat pan frame;

FIG. 13 is a sectional view of the pivot means shown in FIG. 12 taken about on line 13—13 in FIG. 12; and FIG. 14 discloses a modified form of interlacing between the ends of the fabrics of the seat pan and back rest and the cross members at the ends of the back rest and seat pan frames.

With reference to the drawings and particularly to

Figure 1:
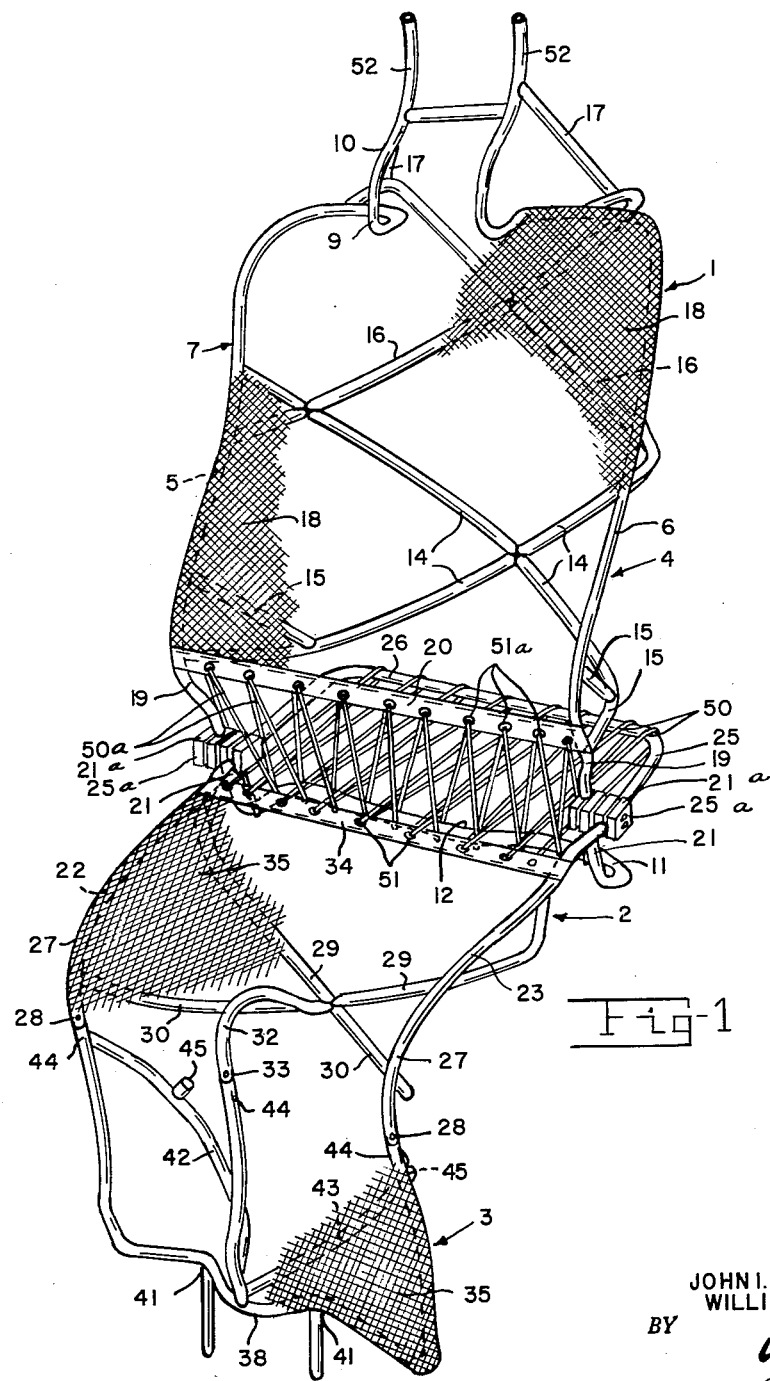
FIG. 1 is a somewhat schematic perspective view of a seat constructed in accordance to the subject invention, showing the parts in assembled relation with the fabric covering broken away and lacing between the adjacent ends of the fabrics and the ends of the tubular back rest frame and seat pan frame.

FIG. 1, the improved seat comprises essentially three sections or frames, namely the upper or back and head rest portion 1, the intermediate or seat pan portion 2, and the lower or leg rest portion 3. The lower end of the upper section 1, and the rear end of the intermediate portion 2 are disposed in intersecting or overlapping relation indicated generally at 4.

The frame of the back and head rest or support comprises the main spaced parallel longitudinal side frame members 5 and 6 contoured somewhat to the shape of the back of the body of the average person who is to occupy the seat, the frame being further shaped and necked down at 9 at the upper end portion which is to be located at opposite sides of the head of an occupant, the frame being curved when viewed from the side somewhat similar to the average back curvature at 10 of the head of an occupant.

The lower ends of the side bars or tubing 5 and 6 of the frame 1 are connected by an integral crossbar member 11, somewhat depressed or bent out of the plane of the frame at 12. A curved crossbar and brace member 13 connects the upper ends of the head portions 10 of the side frames 5 and 6 together forming a rigid substantially open frame with no supporting means inside of the area confined by the frame, in the plane of the frame.

The frame 1, like the other associated frames 2 and 3 is preferably formed of thin-walled strong lightweight metallic tubing, such as, for instance, one-half inch to five-eighths inch O.D. titanium tubing.

The endless encircling frame members are cross-braced by tubular truss or brace members 14, 15, 16 and 17, bowed rearwardly as seen in FIGS. 3 and 4, so as to lie materially rearward of the plane of the main supporting tubular members 5, 6 and 10.

A strong resilient knitted or woven fabric such as made of nylon cords or strands is stretched in medium tension across the main endless frame members 5, 6, 10 and 13, this fabric being indicated at 18, and is suitably firmly connected through its perimeter to the main tubular frame, except at its lower end or edge, the fabric being preferably arranged on the bias.

The lower end portions of the side frame members are bent or disposed in closer parallel relation at 19 and a heavy strong, perferably nylon webbing or strap member 20 is secured at each end to the lower ends 21 of the main frame 1. The lower edge of the nylon fabric structure 18 is securely suitably fastened to the webbing or strap as by stitching or cementing.

The seat pan portion 2, best seen in FIGS. 5, 6 and 7 is also composed of thin-walled tubing and comprises parallel side tubing members 22 and 23 bent at 24 to provide a wider rear end portion 25, connected by the integral crossbar 26. The two side frame members 22 and 23 are curved downwardly at 27 terminating at their outer forward ends in hinge members 28 for connection of upper ends of the leg supporting rest members 3 thereto.

This frame 2 is also firmly cross-braced by the tubing members 29, 30 extending or bowed downwardly below the plane of the side frames 22 and 23. However, an intermediate supporting tubing 31 is rigidly secured to the brace members 29 and 30 at their juncture 31ª and curves upwardly and forwardly at 32 into the plane of the curved portions 27 of the side tubing members 29 and 30 with a hinge member 33 at its extremity in alignment with the hinge members 28. This member 31 is designed to lie between the legs of an occupant and support the fabric 35 which is stretched across the frame between the legs of the occupant.

A strong webbing or strap member 34 is stretched across the frame between the portions 25 of the frame 2 and constitutes a strong flexible resilient support for the resilient fabric 35 that is stretched from side to side across the side frame members 22 and 23 in a similar fashion to the fabric 18 and webbing 20. However, the other or lower end of the fabric 35 is also stretched over the lower or leg rest member or portion 3.

Figure 8:
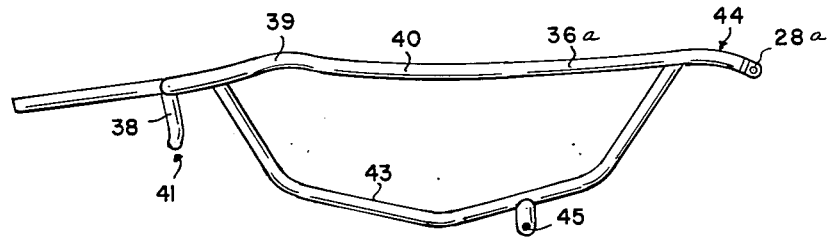
FIG. 8 is a side elevation of the leg rest supporting frame.

The member 3, as best seen in FIGS. 8, 9 and 10, is provided with complemental hinge members 28ª and 34ª which are pivoted to the hinge members 28 and 34, the hinge members 28ª being secured at the opposite ends of a somewhat U-shaped tubular frame comprising parallel side frame members 36 and 36ª, the intermediate tubular member 37 extending from the hinge part 34ª to a crossbar 38 which is firmly secured, as by welding, to the opposite ends of the bars 36, 36ª and 37.

It should be noted that the tubular leg supporting members are curved to substantially the proper contour of the rear or calf portions of the average occupant at 39 and 40 and the crossbar 38, as seen in FIG. 10, is depressed at 41 intermediate the longitudinal rails 36, 36ª and 37 to form valleys or curved supporting portions in the stretched supporting fabric to accommodate the leg portions of the occupant.

The leg rest frame 3 is also triangularly braced by diagonal tubular brace members 42 and 43 which are bowed downwardly, materially out of the plane of the main leg frames 36, 36ª and 37, and the fabric is stretched across between the side frame members 36 and 36ª.

The upper ends of the members 36 and 36ª and 37 are curved at 44 so as to "fair" into the curvature of the curved portions 27 and 32 of the seat pan portion when the hinge element 28, 28ª and 33, 33ª are pivotally connected together and the fabrics 18 and 35 are taut.

The triangular tubular bracing elements 42 and 43 are each provided with hinge anchor elements 45 which are adapted to support the leg rest portion 3 against horizontal and vertical stresses. The back and head rest portion 1 is also supported at 46 (FIG. 3) and the back section 1 is adjusted to at least three positions indicated at 47, 48 and 49 in FIG. 11.

The position 47, as shown in FIG. 11 is the launch or "take-off" position, for the aircraft or vehicle incorporating the seat, at high acceleration. During acceleration the angle of the occupant's body, due to the "give" of the resilient fabric covering on the frames 1, 2 and 3, as indicated diagrammatically at 47ª. After take or blast-off the seat back is adjusted to the normal working position denoted diagrammatically at 48. It is also provided with a third position denoted at 49, which is a "rest" position. The means for adjusting the back section can be any conventional, mechanical or electrical adjusting mechanism between the supporting structure and the seat back and having three or more positions of adjustment and provided with control means convenient to the occupant and settable for automatic adjustment of the seat back to the respective positions 47, 48 and 49.

As before mentioned the seat pan, and the back and head rest are adjustable relative to each other to accommodate occupants of different heights, so as to be substantially universally adaptable for different individuals of different heights, as well as adjustable angularly relative to each other. This is provided for by the arrangement of the lacing between the webs or straps 34 and 20 and the end frames or tubes 26 and 12 on the respective sections 2 and 1. This lacing also secures the lower ends of the resilient fabric 18 to the back rest and the rear end of the fabric portion 35 to the seat pan 2 and provides the desired longitudinal tension on these coverings 18 and 35.

The inner ends of the two frames 1 and 2 overlap or "sort of intersect" each other as seen better in FIG. 2, the narrower end 21 of the back rest frame 1 extending through between the wider portions 25 of the seat pan side frame 2. The portions 21 and 25 clear each other by about three quarters of an inch on each side and are connected to each other for pivoting and longitudinal adjustments by the slidable pivot blocks 21ª and 25ª, best seen in FIGS. 2, 13 and 14, later referred to.

The blocks 21ª are slidable along the frame portions 21 and may be clamped or fixed in any position along the narrower portions 21 of the back rest 1. The blocks 25ª are likewise slidable along the wider portions of the side frame members 21 of the seat pan 2 and the two block "sets" 21ª and 25ª, as seen in FIGS. 12 and 13 are pivoted to each other, thus constituting the hinge or fulcrum between the seat pan 2 and the back rest 1. As shown in FIGS. 13 and 14 the pivot pins between the two blocks are retained therein by the tubular side frames 21 and 25, retaining the pivot pins in place.

The nylon webs or straps 20 and 34 are provided with spaced eyelets 51 and 51ª fairly close together through which the lacings 50 and 50ª are laced.

The lacing 50 is passed alternately through the eyelets 51 and around the end bar 26 until the lacing is substantially completely across the frame 2.

The lacing 50ª is alternately passing through the eyelets 51ª and around the end or crossbar 12 until the lacing for the fabric 18 is complete, substantially across the back frame 1. It is to be noted that the lacing 50 and 50ª pass through each other, thus permitting longitudinal adjustments as well as angular pivotal adjustments about the pivotal center of the pivot blocks 21ª and 25ª.

The lacing and eyelets shown in FIGS. 2 and 14 are relatively widely spaced for clearness, obviously the lacing would be closer together "in practice."

Referring to FIGS. 12 and 13, the pivot blocks of each set, and there are four sets per seat, comprise two blocks each, having the semi-circular, longitudinal recesses to receive the respective side rods or tubular frame members 21 and 25 and are provided with tightening screws 21ᵇ and 25ᵇ as clearly shown. The inner or adjacent blocks of each pair of sets are provided with aligned cores or passages 21ᶜ and 25ᶜ in which is disposed a pivot pin 25ᵈ. The pivot pin 25ᵈ is disposed between the side frame members 21 and 25 and these members retain the pivot pin in place against longitudinal movement.

From the above it will be observed that the nylon webbing can be suitably tensioned by the tension placed on the lacings 50 and 50ª and this is not effected by angular or longitudinal adjustments of the frames 1 and 2, relative to each other.

FIG. 14 disclosed a modified arrangement for connecting the inner ends of the webbings 18 and 35 to the respective cross frame end members 12 and 26.

The end straps or webs 20 secured to the webbing or mesh as before and are provided with spaced nylon webs or straps 20ª, which extend downwardly and around the end frame or rod 12, then upwardly and each is provided with a buckle 20ᵇ for individual tensioning adjustments.

Interposed between the adjustable straps 20ª are the similar straps or webs 34ª which are equally spaced and each is secured to the web 34 and extends rearwardly around the end crossbar or frame 26 of the seat pan 2, and then forwardly and buckles 34ᵇ are provided for adjustment of and tension on the fabric 35.

Like the form shown in FIG. 2, the frames 1 and 2 are pivotally connected together by the slide blocks 21ª and 25ª as shown in FIG. 2.

The above embodiments of the invention herein shown and described are to be regarded as illustrative only and it is to be understood that the invention is susceptible to variations, modifications and changes within the scope of the appended claims.

If desired suitable extensions 52 may be provided at the top of the back rest 2 and at the lower end of the leg rest 3 which may be connected to the aircraft supporting structure for further stabilization and angular adjustment of the sections.

When acceleration forces are applied to the seat the supporting resilient nylon fabric yieldably conforms to the back of the occupant and uniformly supports the occupant from head to foot against acceleration forces without danger or "blackout," event up to 16 G's.

If desired the frame may be provided with holddown pads and resilient protectors engaging the forward portions of the occupant, such as the body portion, head, arms and legs to hold the occupant in place on the nylon fabric 35 during excessive decelerations, also the seat may be provided with arm rest of yieldable pad material, and an instrument control panel placed convenient to the fingers of the occupant to control the relative angular adjustment of the seat or chair elements 1 and 2 and other necessary controlled devices, such as the holddown pads (not shown) for the occupant's head, shoulders, body, knees and legs during deceleration to hold the occupant firmly in position on the seat during severe decelerations.

Since the back element 1 of the chair is provided, as shown diagrammatically in FIG. 11, with three adjustments indicated at 47, 48 and 49, some adjusting means is preferably provided for automatically adjusting the seat back to these several positions. The adjusting means itself forms no part of the invention and any type of position adjusting means may be provided, also if more than three adjustments are desired, this can be accomplished in a self-evident manner. By employing a reversible motor (A) operating a lever B connected by a link C to the back of back rest side bars or truss bracing at D adjustment can be automatically accomplished, the motor A being of hydraulic piston and cylinder type pivoted at E and controlled by three-way valve F through a valve handle G, pressure being supplied by a suitable source through inlet pipe H. Moving the handle G forward shifts the back rest to the position 47. Shifting the handle G to mid-position opens both ports to pressure and shifts the back rest to the position 48, while pulling the valve handle back inclines the back rest to the rest position 49.

When acceleration occurs with the occupant inclined forwardly, as indicated by dotted line 47 the resilient nylon fabric gives, and conforms to the curvature of the back of the occupant and comfortably supports substantially all of the back portion, allowing the occupant to assume a further forwardly inclined position, due to the give of the fabric, diagrammatically indicated at 47ª in FIG. 11.

Where holddown means are used for embracing the occupant's body, head and parts of the limbs, similar tensioning means for the various holddown elements can be incorporated on the frame of the chair, to that of the back frame adjustment mechanism, with the controls therefor placed on the chair convenient for manipulation and control by the hands of the occupant.

It will be apparent that various modifications and minor changes may be made in construction as shown and described without departing from the spirit and scope of the invention as defined by the accompanying claims.

What we claim is:

1. An adjustable seat comprising an upper open back and head supporting frame substantially conforming in side profile to the curvature of the back, neck and head of an occupant for said seat, said frame having spaced side frame members and transverse cross frame members connected substantially at the opposite ends of the side frame members, an open seat thigh and leg supporting frame having a side profile conforming substantially to the contour of the back of the seat, thighs and legs of an occupant for the seat, said frame members being disposed at the lower end portion of the back and head portion of the back and head supporting frame in angularly intersecting relation to the rear end portion of the seat supporting portion of said seat, thigh and leg supporting frame, adjustable pivot means connecting said frames together for pivotal adjustment at the points of angular intersection thereof, said pivot means being adjustable longitudinally along the side frame members of both of said back and head supporting frame and said seat thigh and leg supporting frame for vertical adjustment of said back and head supporting frame on said seat, thigh and leg supporting frame and for forward and rearward adjustment of said seat, thigh and leg supporting frame, relative to said back and leg supporting frame, a first flexible resilient covering tensioned across said open back and head supporting frame and secured to the side and cross frame members thereof, a second independent resilient flexible covering tensioned across said seat, thigh and leg supporting frame and secured to the side and cross frame members thereof.

2. An adjustable seat comprising an open back supporting frame having a lower parallel extension and a seat supporting frame having a rear parallel extension disposed in angular crossing relation to the first mentioned extension, one of said extensions being wider than the other extension, pivot means connecting said extensions together for agular and longitudinal adjustments, said pivot means being slidably secured to both of said extensions for longitudinal adjustment of either of said frames with respect to the other frame, a cross web member connected from side to side to each of said frames adjacent the beginning of said extensions, a flexible resilient covering tensioned across each of said frames and secured along its perimeter to the opposite sides and to the end remote from the extension of each of said frames, and to the cross web member of that frame, said coverings being independent of each other, laterally spaced connecting means between said cross web members and the outer end portions of said extensions with said connecting means between the cross web member and said remote end portion of the extension of one of the frames disposed intermediate the spaced connecting means between the cross web member and said remote outer end portion of the extensions of the other frame.

3. An adjustable seat having an upper open back supporting frame having substantially parallel spaced side frame members and an upper cross frame member connecting the upper ends of the side frame members together, said side frame members having spaced parallel extensions at their opposite ends and a lower cross frame member connecting the outer ends of said extensions forming a lower extension, together forming said open rigid back supporting frame, said frame having a side profile conforming substantially to the back profile of an average occupant for said seat, said seat having an open seat and thigh supporting frame having substantially parallel side frame members and a forward transverse cross frame member connecting the forward ends of the last mentioned side frame members together, said seat and thigh supporting frame having a side contour conforming substantially to the back profile of the seat and thighs of an average occupant for said seat, said substantially parallel side frame members of said seat and thigh supporting frame having parallel rearward extensions thereon at the rear ends thereof and a transverse rear cross frame member connecting the outer ends of said last mentioned extensions together, forming a rearward extension on said seat and thigh supporting frame, said lower extension and said rearward extension being of different widths and disposed in intersecting angular relation to each other, longitudinally adjustable pivot means slidably and pivotally connecting both sides of said lower and rearward extensions together for relative longitudinal adjustment on each other, a first transverse narrow web member tensioned across said back supporting frame adjacent said lower extension between the back supporting frame and its lower extension, a second transversed narrow web member tensioned across said seat and thigh supporting frame adjacent the said rearward extension between the seat and thigh supporting frame and its rearward extension, a first reslient flexible covering tensioned across said back supporting frame connected at opposite sides and upper end around its perimeter to said side frame members and to said upper cross frame member of said back supporting frame and secured across its lower edge to said first transverse narrow web member on the last mentioned frame, laterally spaced lacing means disposed between the sides of said lower extension connecting said first transverse narrow web member on said back supporting frame to said lower transverse cross frame member on said lower extension on the last mentioned frame, a second resilient flexible covering tensioned across said seat and thigh supporting frame connected at opposite sides and its forward end around its perimeter to the substantially parallel side frame members and the connected transverse forward cross frame member of said seat and thigh supporting frame, and secured across its opposite end to the second transverse web member of the last mentioned frame, a second adjustable laterally spaced lacing means passing through and between the first mentioned lacing means connecting said second transverse web member to said rear transverse cross frame member of said rearward extension, whereby said back supporting frame and said seat and thigh supporting frame are both angularly and longitudinally adjustable relative to each other without disturbing the tension on the two flexible resilient coverings.

4. A crew seat for aircraft and the like responsive to high acceleration comprising an open back frame having a profile substantially conforming in side elevation to the curvature of the back of an occupant therefor, an open seat frame having a profile in side elevation substantially conforming to the rear of the seat and lower portion of an occupant therefor, adjustable pivot means on said open back frame and on said open seat frame comprising means for pivotal and longitudinal adjustments of said back and seat frames relative to each other, a first flexible resilient supporting fabric tensioned across said open back frame from side to side and end to end to support the back and upper portion of an occupant, a second flexible resilient fabric tensioned across said open seat frame from end to end and side to side independently of said first flexible resilient fabric to support the seat and lower portion of the occupant, whereby upon acceleration of an aircraft having the said seat mounted thereon the fabrics will yield independently of each other and substantially conform to the back of the body and lower portion of the body of an occupant occupying the seat.

5. A crew seat for aircraft and the like responsive to high accelerations comprising an endless open back, neck and head supporting frame substantially conforming in side profile to the curvature of the back, neck of the body and head of an occupant therefor, an endless open seat and leg supporting frame having a side profile substantially conforming to the back of the lower portion of an occupant therefor, said lower end portion of said back, neck, and head supporting frame and the rear portion of said seat and leg supporting frame disposed in angularly intersecting relation, adjustable pivot means disposed on the line of intersection between said frames between said back and head supporting frame and said seat and leg supporting frame comprising means for pivotal adjustments between said open back and head supporting frame and said open seat and leg supporting frame and longitudinal adjustments of each of said frames on the other frame, a first flexible resilient body supporting fabric tensioned across said open back and head supporting frame from end to end and side to side, a second flexible resilient supporting fabric tensioned across said open seat and leg supporting frame from end to end and side to side independently of said first resilient supporting fabric, whereby upon accelerations of an aircraft having the seat fixed therein the fabrics will yield independently of each other and conform substantially to the curvature back, neck and head portions and to the rear portions of the seat, lower portion and legs of an occupant occupying the seat, to substantially support the entire back portion from head to legs of an occupant occupying said seat during high accelerations of an aircraft having said seat fixed therein.

6. A crew seat for an aircraft and the like which is responsive to high accelerations comprising, an endless open back and head supporting frame having a curved profile in side elevation substantially conforming to the curvature of the back portion of the body and head of an occupant for the seat, said frame having a lower extension terminating in a transverse cross bar, an endless open seat and leg supporting frame having a curved profile in side elevation substantially conforming to the back of the seat, lower portion, and legs of an occupant for the seat, said open seat and leg supporting frame having a rearwardly extending extension terminating in a transverse cross bar, a first resilient flexible fabric tensioned across said head and back supporting frame from side to side and from the upper end terminating substantially at the beginning of said extension of said back and head supporting frame, a second resilient flexible fabric tensioned across said open seat and leg supporting frame from side to side and from the forward end of that frame terminating substantially at the beginning of said rearward extensions, said seat having said lower extension and said rearward extension disposed in crossed or overlapped relation, adjustable pivot clamp means between said extensions providing pivot means between said back and head supporting frame and said seat and leg supporting frame and providing individual longitudinal adjustment of said back and head supporting frame on said seat and leg supporting frame and forward and rearward adjustment of said back and head supporting frame on said seat and leg supporting frame and angular adjustments between said frames, spaced longitudinal tensional means between the lower end of said first resilient flexible fabric and said transverse bar on said rearward extension for tensioning said first fabric between the upper and lower ends of said back and head supporting frame, and spaced longitudinal tensioning means between the rear end of said second resilient fabric and said transverse cross bar on said rearward extension, extending through the spaces between the first mentioned tensioning means, for adjusting the fore and aft tensions on said second fabric permitting the aforesaid longitudinal adjustment of the back and head supporting frame, the forward and rearward relative adjustments of the seat and leg supporting frames, and angular adjustments between the frames, without disturbing the tension on the flexible resilient fabrics on said frames.

7. An adjustable seat comprising an upper back, neck and head supporting open frame substantially conforming in side profile to the curvature of the back of the body, neck and head of an occupant for said seat, said frame comprising spaced apart parallel tubular side members, a connected upper tubular cross member therebetween, a lower tubular cross frame member connected between the lower ends of said tubular side frame members, a transverse flexible cross web member connected to said side frame members in materially upwardly spaced relation from said lower tubular cross frame member, a resilient flexible nylon mesh body, neck and head supporting fabric tensioned completely across said frames between said tubular side frame members and between said upper tubular cross frame member and said transverse flexible cross web member, first transversely spaced flexible connecting tensioning means between said web member and said lower tubular cross frame member, a lower seat, thigh and leg supporting open frame substantially conforming in side profile to the curvature of the back portions of the seat, thighs and legs of an occupant for said seat, said lower seat, thigh and leg supporting open frame comprising spaced parallel tubular side frame members, the lower end of said upper frame below said flexible cross web member extending a material distance angularly through between said tubular side frame members of said open seat, thigh and leg supporting frame, adjustable clamping pivot means slidably and pivotally connecting said tubular parallel side frame members at both sides together at the point of angular intersection of the upper and lower frames, said pivot means being slidably adjustable on the tubular side frame members of both of said frames, transverse cross bar member connecting the extremities of the parallel tubular side frame members of the lower frame together at its forward and rear intersecting ends, a second cross web member connected to the last mentioned side frame members forwardly of the point of intersection thereof by said upper frame, a resilient nylon mesh seat, thigh and leg supporting fabric tensioned completely across said lower frame between the tubular side frame members and between the cross frame member remote from the point of intersection of the frames and said second cross web member, and a second transversely spaced flexible connecting means extending through the spaces between the first transversely spaced connecting means and connecting said second web member to the transverse cross frame member of said lower frame at the other side of the intersection between the two frames.

8. Apparatus as claimed in claim 7 in which said lower, seat, thigh and leg supporting open frame is adjustably hinged intermediate its longitudinal ends between the seat and thigh supporting portion and the leg supporting portion thereof, to provide angular adjustments in said lower open seat, thigh and leg supporting frame, between the thigh and leg supporting portions, and cross bracing between the side frame members of said lower frame bent materially rearwardly and downwardly out of the plane of said second resilient fabric, whereby when said fabrics "gives" during accelerations the bent portions will be out of the path of deflection of that seat fabric.

9. Apparatus as claimed in claim 8 in which said lower frame is provided with an intermediate longitudinal rigid supporting member parallel to the side frame members and extending upwardly from the lower cross frame member to a point intermedial the seat supporting portion and the thigh supporting portion, to support the said second fabric on that frame, between the legs and thighs of an occupant occupying the seat.

References Cited in the file of this patent

UNITED STATES PATENTS

| | | |
|---|---|---|
| 845,039 | Leavitt | Feb. 19, 1907 |
| 2,355,635 | Dubilier | Aug. 15, 1944 |
| 2,586,433 | Lepp et al. | Feb. 19, 1952 |
| 2,702,074 | Vincent | Feb. 15, 1955 |
| 2,751,606 | Benker | June 26, 1956 |
| 2,812,146 | Chaplin | Nov. 5, 1957 |
| 2,829,702 | Keating | Apr. 8, 1958 |
| 2,831,529 | Williams | Apr. 22, 1958 |

FOREIGN PATENTS

| | | |
|---|---|---|
| 7,264 | Great Britain | 1884 |